(12) United States Patent
Johnson et al.

(10) Patent No.: US 7,885,830 B2
(45) Date of Patent: Feb. 8, 2011

(54) INFRASTRUCTURE METHOD AND SYSTEM FOR MANAGING DEDUCTIBLES FOR INSURANCE POLICIES

(75) Inventors: Jerromy Laverne Johnson, San Antonio, TX (US); Michael Hongming Chan, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 1540 days.

(21) Appl. No.: 10/649,237

(22) Filed: Aug. 26, 2003

(65) Prior Publication Data

US 2004/0049410 A1 Mar. 11, 2004

Related U.S. Application Data

(60) Provisional application No. 60/406,248, filed on Aug. 27, 2002.

(51) Int. Cl.
  *G06Q 40/00* (2006.01)
(52) U.S. Cl. ................. 705/4; 704/2; 704/3
(58) Field of Classification Search ............ 705/2–4
  See application file for complete search history.

(56) References Cited

U.S. PATENT DOCUMENTS

| | | | |
|---|---|---|---|
| 4,831,526 A | | 5/1989 | Luchs et al. |
| 5,133,068 A | * | 7/1992 | Crus et al. ......................... 1/1 |
| 5,191,522 A | * | 3/1993 | Bosco et al. ................... 705/4 |
| 5,231,571 A | | 7/1993 | D'Agostino |
| 5,325,291 A | * | 6/1994 | Garrett et al. .................. 705/4 |
| 5,655,085 A | * | 8/1997 | Ryan et al. ..................... 705/4 |
| 5,832,447 A | * | 11/1998 | Rieker et al. ................... 705/2 |
| 5,991,733 A | | 11/1999 | Aleia et al. |
| 6,061,691 A | * | 5/2000 | Fox ................................. 1/1 |
| 6,186,793 B1 | | 2/2001 | Brubaker |
| 6,584,446 B1 | | 6/2003 | Buchanan et al. |
| 6,826,594 B1 | * | 11/2004 | Pettersen .................... 709/203 |
| 2001/0023404 A1 | | 9/2001 | Ogawa et al. |
| 2002/0049617 A1 | * | 4/2002 | Lencki et al. .................. 705/4 |
| 2002/0055862 A1 | | 5/2002 | Jinks |
| 2002/0156656 A1 | * | 10/2002 | Harrell et al. .................. 705/4 |
| 2004/0205534 A1 | * | 10/2004 | Koelle .......................... 715/507 |
| 2005/0075911 A1 | * | 4/2005 | Craven .......................... 705/4 |
| 2007/0067735 A1 | * | 3/2007 | Hawley et al. .............. 715/792 |
| 2008/0097788 A1 | * | 4/2008 | Dang ............................. 705/2 |

OTHER PUBLICATIONS

Health benefits costs for cos & employees: New benchmarks by region, industry, size, plan. (Jun. 2002). The Controller's Report,(6), 1,18+.*

(Continued)

*Primary Examiner*—Charles R Kyle
*Assistant Examiner*—Ryan D Donlon
(74) *Attorney, Agent, or Firm*—Townsend and Townsend and Crew LLP (57) ABSTRACT

Insurance policy deductibles are managed by a plurality of interrelated tables each including a plurality of variables. The variables in a first table include a geographical variable, a transaction variable and an effective policy date variable. The variables in another table include additional geographic variables, structural characteristics, amount of insurance and provides controls for managing deductibles. The variables in a further table distinguish deductibles available to the policies. In an additional table, the variables identify movement from an old deductible to a new deductible.

17 Claims, 7 Drawing Sheets

OTHER PUBLICATIONS

Mark Weisbrot. (Jun. 27, 1997). Medicare cuts: courage or cowardice :[1,2,3,4,5,6,7,8 Edition]. The San Diego Union-Tribune,p. B-9:6,7,8.*

By Heather Rude Star Staff Reporter. (Jun. 14, 1990). No-fault insurance rates 'all over map,' brokers say :[FINAL Edition]. The Windsor Star,p. A3.*

"ChoicePoint, Jan. 24, 2002, [online], Retrieved from web.archive.org using the Internet <URL:http://web.archive.org/web/20020124085629/http://www.choicepoint.net/>."

U.S. Appl. No. 10/649,252, filed Aug. 26, 2003; first named Inventor: Jerromy Laverne Johnson.

* cited by examiner

Reference Database - Master Reference Table 100

| Company Code | Product Service Line of Business Code | State Code | System Application Code | Business Transaction Code | Reference Date | Use Policy Effective Date Indicator | Policy Deductible Surrogate Key |
|---|---|---|---|---|---|---|---|
| 0 | 6 | AR | DW | QQ | 5/1/02 | YES | 30006 |
| 0 | 6 | AR | DW | QQ | 1/1/02 | YES | 30005 |
| 0 | 6 | AR | DW | IS | 5/1/02 | YES | 30006 |
| 0 | 6 | AR | DW | IS | 1/1/02 | YES | 30005 |
| 0 | 6 | AR | DW | | 5/1/02 | YES | 30007 |
| 0 | 6 | AR | DW | | 10/1/01 | YES | 30002 |

Fig. 1

Reference Database - Policy, Deductible Table 200

| Pol Ded Surr Key 116 | Cov Type Code 202 | Prop Loc Cnty Code 204 | Prop Loc Zip 206 | Roof Type Code 208 | Beg Range Amnt 210 | End Range Amnt 212 | Ded Type SHA 214 | Def Ded Amnt 216 | Def Ded Pct 218 | Stand Ded Amnt 220 | Stand Ded Pct 222 | Def Ded Year Qty 224 | Buy Down Msg Ind 226 | Avl Ded Surr Key 228 | Ovr Def Ded Ind 232 | New Ded Map Ind 234 | UNC Map Ind 236 | New Ded Surr Key 230 | Next High Ded Ind 238 |
|---|---|---|---|---|---|---|---|---|---|---|---|---|---|---|---|---|---|---|---|
| 30007 | | | | | 0 | 99999 | ALL | 250 | | 500 | | | YES | 10002 | N | Y | N | 6210 | Y |
| 30007 | | | | | 100000 | 149999 | ALL | 500 | | 500 | | | YES | 10002 | Y | Y | N | 6211 | Y |
| 30007 | | | | | 150000 | 299999 | ALL | 500 | | 500 | | | YES | 10004 | N | Y | N | 6211 | Y |
| 30007 | | | | | 300000 | 599999 | ALL | 500 | | 500 | | | YES | 10005 | N | Y | N | 6211 | Y |
| 30007 | | | | | 600000 | 999999999 | ALL | 500 | | 500 | | | YES | 10005 | N | Y | N | 6212 | Y |
| 30007 | | 1 | | | 0 | 99999 | OTHER | 250 | | 500 | | | YES | 30009 | N | Y | N | 6212 | Y |
| 30007 | | 1 | | | 0 | 99999 | WH | 500 | | 500 | | | YES | 30009 | Y | Y | N | 6213 | Y |
| 30007 | | 1 | | | 100000 | 149999 | OTHER | 500 | | 500 | | | YES | 30009 | Y | Y | N | 6213 | Y |
| 30007 | | 1 | | | 100000 | 149999 | WH | 500 | | 500 | | | YES | 30009 | N | Y | N | 6213 | Y |
| 30007 | | 1 | | | 150000 | 299999 | OTHER | 500 | | 500 | | | YES | 30010 | N | Y | N | 6213 | Y |
| 30007 | | 1 | | | 150000 | 299999 | WH | 500 | | 500 | | | YES | 30011 | N | Y | N | 6213 | Y |
| 30007 | | 1 | | | 300000 | 599999 | OTHER | 500 | | 500 | | | YES | 30011 | N | Y | N | 6213 | Y |
| 30007 | | 1 | | | 300000 | 599999 | WH | 500 | | 500 | | | YES | 30011 | N | Y | N | 6213 | Y |
| 30007 | | 1 | | | 600000 | 999999999 | OTHER | 500 | | 500 | | | YES | 30009 | Y | Y | N | 6212 | Y |
| 30007 | | 1 | | | 600000 | 999999999 | WH | 500 | | 500 | | | YES | 30009 | Y | Y | N | 6213 | Y |
| 30007 | | 2 | | | 0 | 99999 | OTHER | 250 | | 500 | | | YES | 30009 | N | Y | N | 6213 | Y |
| 30007 | | 2 | | | 0 | 99999 | WH | 500 | | 500 | | | YES | 30010 | N | Y | N | 6212 | Y |
| 30007 | | 2 | | | 100000 | 149999 | OTHER | 500 | | 500 | | | YES | 30010 | N | Y | N | 6213 | Y |
| 30007 | | 2 | | | 100000 | 149999 | WH | 500 | | 500 | | | YES | 30011 | N | Y | N | 6213 | Y |
| 30007 | | 2 | | | 150000 | 299999 | OTHER | 500 | | 500 | | | YES | 30011 | N | Y | N | 6213 | Y |
| 30007 | | 2 | | | 150000 | 299999 | WH | 500 | | 500 | | | YES | 30011 | N | Y | N | 6213 | Y |
| 30007 | | 2 | | | 300000 | 599999 | OTHER | 500 | | 500 | | | YES | 30011 | N | Y | N | 6213 | Y |
| 30007 | | 2 | | | 300000 | 599999 | WH | 500 | | 500 | | | YES | 30011 | N | Y | N | 6213 | Y |
| 30007 | | 2 | | | 600000 | 999999999 | OTHER | 500 | | 500 | | | YES | 30011 | N | Y | N | 6213 | Y |
| 30007 | | 2 | | | 600000 | 999999999 | WH | 500 | | 500 | | | YES | 30011 | N | Y | N | 6213 | Y |
| 30007 | | 4 | | | 0 | 99999 | OTHER | 250 | | 500 | | | YES | 30009 | N | Y | N | 6212 | Y |

Fig. 2

Reference Database - Available Deductible Table 300

| Available Deductible Surrogate Key 228 | Available All/Other Deductible Amount 302 | Available All/Other Deductible Percent 304 | Available Wind & Hail/Hurricane Deductible Amount 306 | Available Wind & Hail/Hurricane Deductible Percent 308 |
|---|---|---|---|---|
| 30011 | | 0.01 | | 0.01 |
| 30011 | | 0.01 | | 0.02 |
| 30011 | | 0.02 | | 0.02 |
| 30011 | 100 | | 100 | |
| 30011 | 250 | | 250 | |
| 30011 | 500 | | | 0.01 |
| 30011 | 500 | | | 0.02 |
| 30011 | 500 | | 500 | |
| 30011 | 1000 | | | 0.01 |
| 30011 | 1000 | | | 0.02 |
| 30011 | 1000 | | 1000 | |
| 30011 | 2500 | | | 0.01 |
| 30011 | 2500 | | | 0.02 |
| 30011 | 2500 | | 2500 | |

Fig. 3

Reference Database - New Deductible Table 400

| New Deductible Surrogate Key (230) | Available All/Other Deductible Amount (402) | Available All/Other Deductible Percent (404) | Available Wind & Hail/Hurricane Deductible Amount (406) | Available Wind & Hail/Hurricane Deductible Percent (408) | New All/Other Deductible Amount (410) | New All/Other Deductible Percent (412) | New Wind & Hail/Hurricane Deductible Amount (414) | New Wind & Hail/Hurricane Deductible Percent (416) |
|---|---|---|---|---|---|---|---|---|
| 6213 | | | 100 | | | | 500 | |
| 6213 | | | 250 | | | | 500 | |
| 6213 | | | 500 | | | | 1000 | |
| 6213 | | | 1000 | | | | 2500 | |
| 6213 | | | 2500 | | | | | |
| 6213 | 100 | | | | 500 | | | |
| 6213 | 250 | | | | 500 | | | |
| 6213 | 500 | | | | 1000 | | | |
| 6213 | 1000 | | | | 2500 | | | |
| 6213 | 2500 | | | | | | | |

INFRASTRUCTURE METHOD AND SYSTEM FOR MANAGING DEDUCTIBLES FOR INSURANCE POLICIES

This application claims priority to U.S. application Ser. No. 60/406,248 filed Aug. 27, 2002, entitled HOMEOWNER RISK SEGMENTATION AND DEDUCTIBLE INFRASTRUCTURE, which is incorporated herein by reference in its entirety.

BACKGROUND

The disclosures herein relate generally to formulating insurance policy deductibles and more particularly to controlling and applying a structure for deductibles for new and renewal policies.

Historically, deductible options vary from state to state, and often do not include special peril deductibles (hurricane, wind/hail) that would be helpful in improving risk mitigation efforts in catastrophe prone areas. An infrastructure that controls the availability, migration and management of deductibles will allow the insurer to implement deductible adjustments using a number of variables, and implement them in the most efficient time and cost effective manner.

Therefore, what is needed is a deductible infrastructure that facilitates the implementation of risk management programs, in order to manage an insurer's catastrophe exposure and minimize the risk of adverse financial impact while continuing to service insured parties in highly exposed areas.

SUMMARY

One embodiment, accordingly, provides for a method and system for managing deductibles for insurance policies. A plurality of interrelated tables are provided, each of which include a plurality of variables. A first key reference is provided in one table to identify a specific group of the variables. The first key reference is matched to another table to identify a second specific group of variables and a plurality of additional key references. The plurality of additional key references are matched to a plurality of respective additional tables to determine a deductible for a related policy.

A principal advantage of this embodiment is that risk sharing is increased between the insurer and the insured. Deductible adjustments are implemented using multiple variables in the most time efficient and cost effective manner. This embodiment may be applied to various types of insurance coverage.

BRIEF DESCRIPTION OF THE DRAWINGS

FIG. 2 is a table illustrating an embodiment of a policy deductible structure.

DETAILED DESCRIPTION

The deductible or deductible combination for each policy is driven by a series of tables each including vertical rows or columns and horizontal lines. These tables are based on matching the policy characteristics or variables to those listed in the tables. Identification of a given variable in these tables is all inclusive unless otherwise identified. For example, for a residence or structure, roof type is a variable in the table, but not all roof types are listed. The absence of a roof type indicates all possible roof types follow that line entry. This allows the table to handle all possibilities without entering every possibility; only the exceptions. However for some variables, every possibility will be included, i.e. AOI (Amount of Insurance) to ensure completeness.

Figure 1:
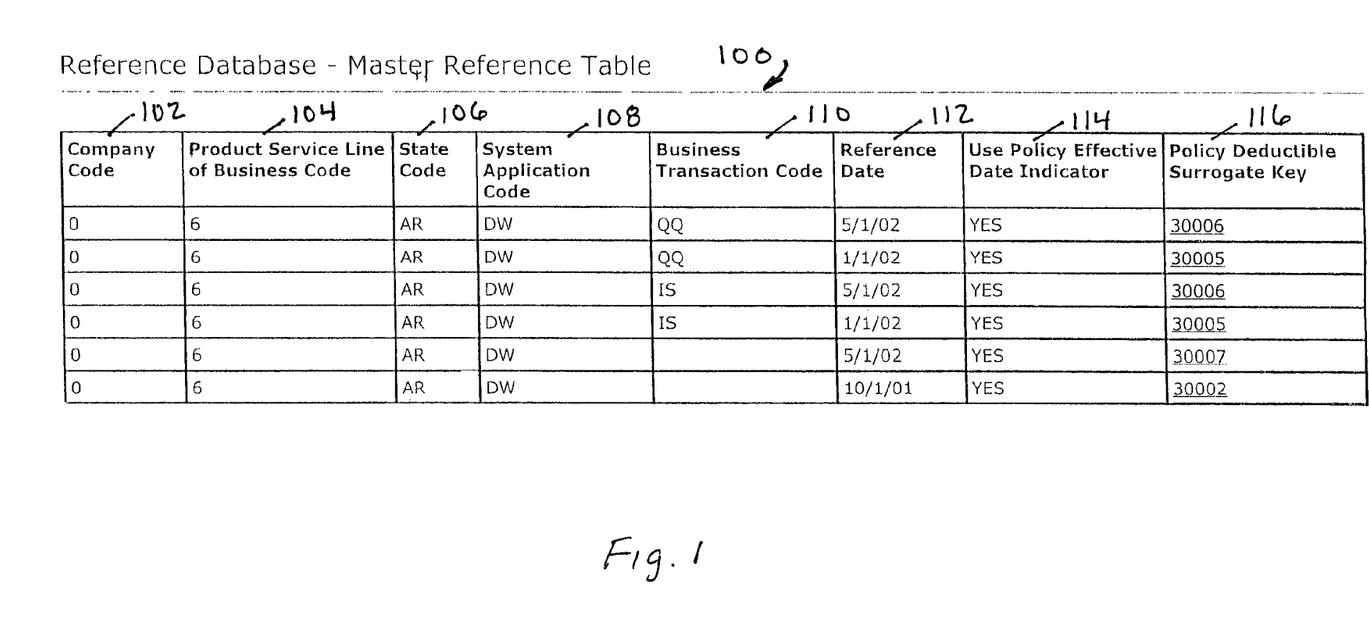
FIG. 1 is a table illustrating an embodiment of a master reference structure.

The base table is the master reference table 100, FIG. 1, which allows deductibles to be managed based on a code for a Company 102 (official insurance company name), Line of Business 104, State 106, Application 108, Transaction Type 110 (quote, new business, renewal . . . ), Date reference for changes 112, Policy Effective or Written Date 114, and a Key 116 to match to a policy deductible table 200, FIG. 2.

The main function of the master reference table 100 is to control an initial placement based on a geographical location, such as a state or a part of a state, and also based on a transaction, such as a new or a renewal policy, and with regard to the effective date of the policy.

The policy deductible table 200 is the primary control table. It includes the Match Key 116 from the master reference table 100, the Coverage Type Code 202 for different policy forms, a County/Zip combination 204, 206 for location variances, Roof Type 208, Beginning and End Ranges for AOI 210, 212, and sections to control the Deductible Type and Amounts. These sections identify the deductible type 214, the default deductible amount 216 and default percentage 218, and the base or standard deductible amount 220 and standard percentage 222. The structure will allow the current deductibles at renewal to continually increase (roll-up) or renew the policy at the default amount/percentage every year for up to 99 years 224. Although a typical roll-up would occur only once, the capability is still available. The table 200 includes links to additional tables (discussed below). One is to identify the available deductibles 228 for policies meeting the selected criteria called the available deductible table (discussed below). The other 230 links to the new deductible table (also discussed below) which details the migration from the current deductible to a new renewal deductible in a situation like a roll-up or the elimination of a deductible amount/percentage.

The policy deductible table 200 also sets an indicator 226 to post a message on the Dwelling System based on the type of program or suggestion for other coverage available. Other indicators include an indicator 232 to increase the renewal deductible to the default amount/percentage when the policies AOI increases from one range to another, an indicator 234 to identify migration from a current deductible to a new deductible amount/percentage, an indicator 236 for unconditional mapping based on a decision to map all deductibles to "x" amount/percentage, and an indicator 238 to indicate which deductible to apply if the current renewal amount/percentage is no longer available at renewal and is not set in the new deductible table, i.e., next higher amount/percentage or next lower amount/percentage. The indicator 238 is a fail-safe feature that includes the ability to identify the next higher/lower deductible using amounts and percentages. It will calculate the percentage amount based on the current AOI and compare to the other available amounts before choosing the next higher or lower deductible.

The policy deductible table 200 is the overall controlling table for each variable used to distinguish both the available, or old, deductibles and the new deductibles when changes to the deductibles are required, i.e. when the deductibles are eliminated, increased or decreased.

Figure 3:
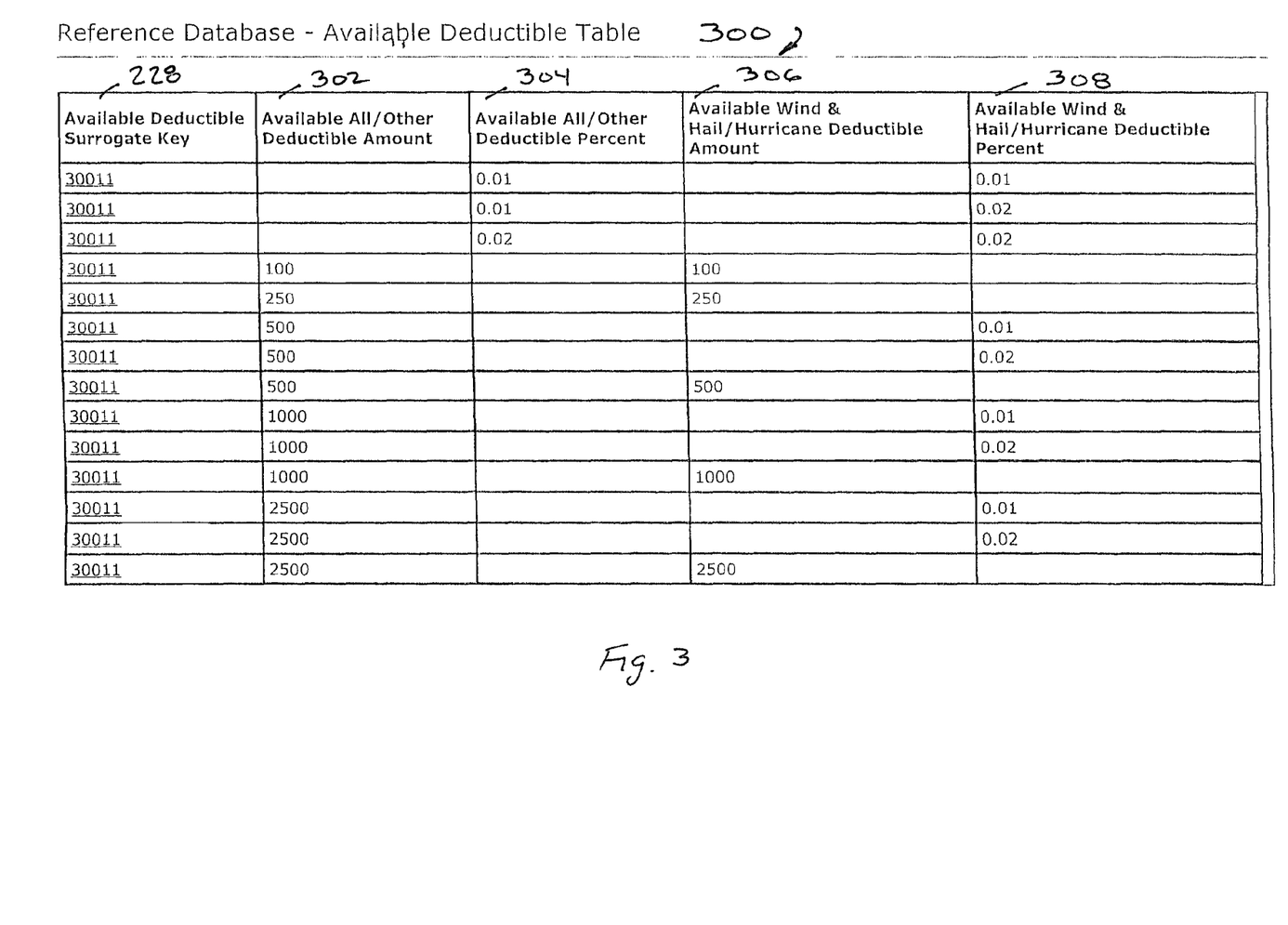
FIG. 3 is a table illustrating an embodiment of an available deductible structure.

The available deductible table 300 includes the match key 228 and all possible deductible combinations to include all other perils amounts 302 and percentages 304. The attached example also displays split Wind/Hail deductible combinations for a high AOI range to include amounts 306 and percentages 308. This table allows the insurer to limit the combinations available for each line entry. Although not practical, each line entry in the policy deductible table 200 could have a corresponding available deductible table 300. As this infrastructure or any deductible program change is implemented, old/current deductibles could be eliminated. As those are eliminated, it must be replaced and renewed with a new amount/percentage.

The available deductible table 300 distinguishes the deductible available to those policies identified through their key reference numbers in the master reference table 100 and the policy deductible table 200.

Figure 4:
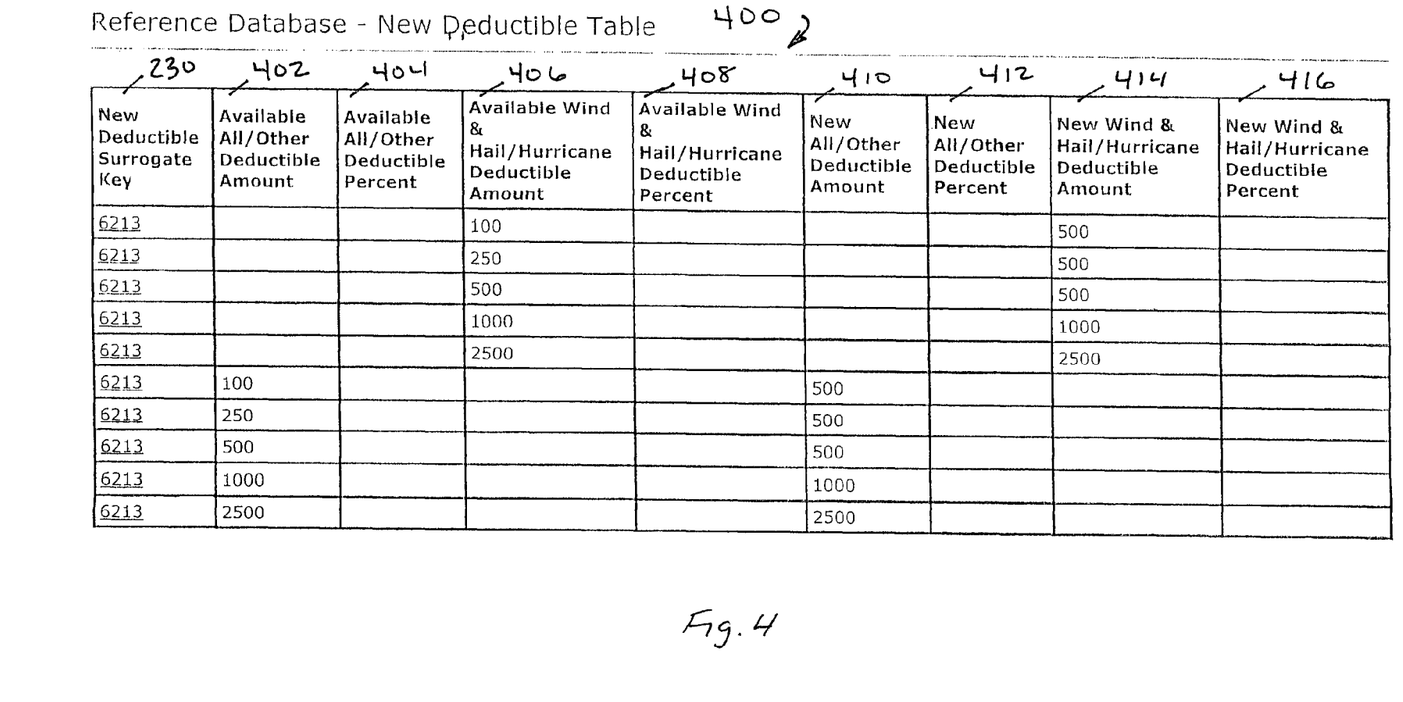
FIG. 4 is a table illustrating an embodiment of a new deductible structure.

The new deductible table 400 displays the migration from old to new. The table 400 includes the match key 230 and displays each of the old deductible types for all other perils including an amount 402 and a percentage 404. The table 400 also specifies the old deductible for wind and hail/hurricane including an amount 406 and a percentage 408. The table also displays each of the new deductible types for all other perils including an amount 410 and a percentage 412. The table 400 further specifies new deductible types for wind and hail/hurricane including an amount 414 and a percentage 416. Old deductible types are identified as "Available" and the new renewal deductible types are identified as "New". Every possible deductible is included and has a corresponding "New"; even if they are equal.

The new deductible table 400 identifies movement from the available, or old, deductible to a new deductible.

These tables are driven by a process flow that links the Dwelling System to the resulting deductible that is applied to the policy. The attached process flow and table structure controls a tremendous number of possibilities with a few short steps.

Figure 5:
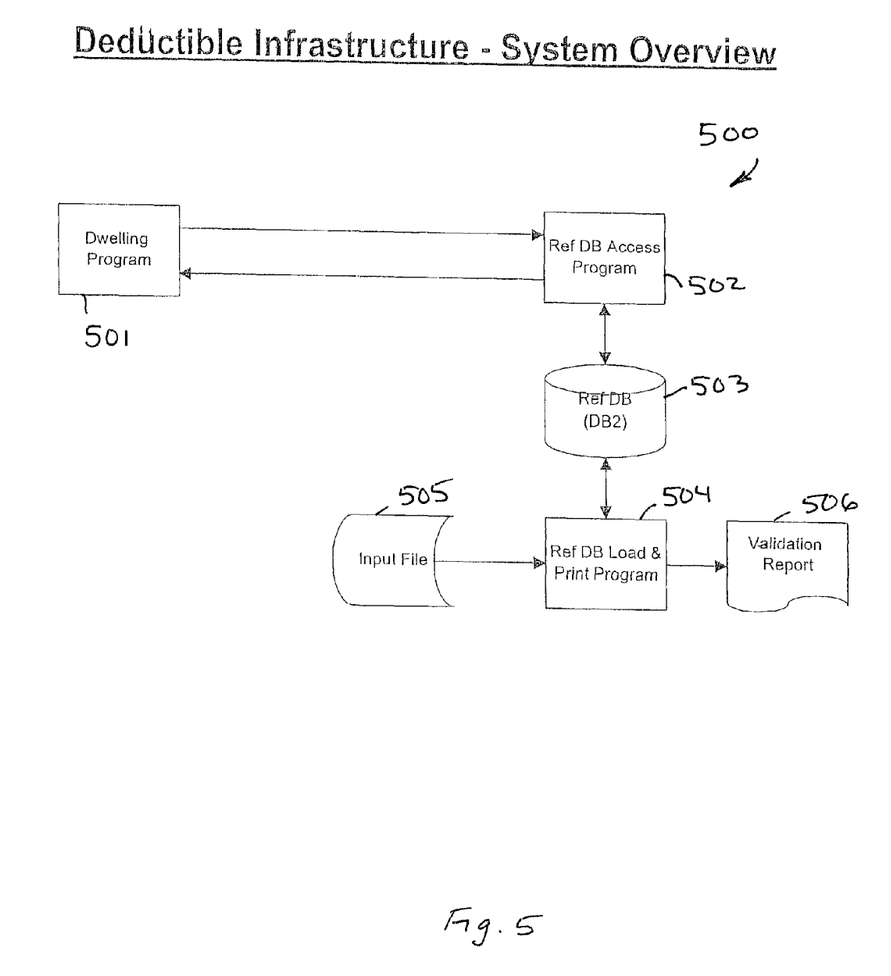
FIG. 5 is a flow chart illustrating an embodiment of a deductible infrastructure system overview.

The Deductible Infrastructure—System Overview 500, FIG. 5, is an overview of the deductible database and its interaction with a dwelling application system and input and output programs. A policy system 501 displays the system that issues, renews, or modifies property policies. An interface 502 is a program that allows the policy system 501 to interact with a deductible database 503, which contains the tables 100, 200, 300 and 400 in FIGS. 1-4. An interface program 504 interacts with the deductible database 503 to input table changes at 505 and track and report those changes at 506.

Figure 6:
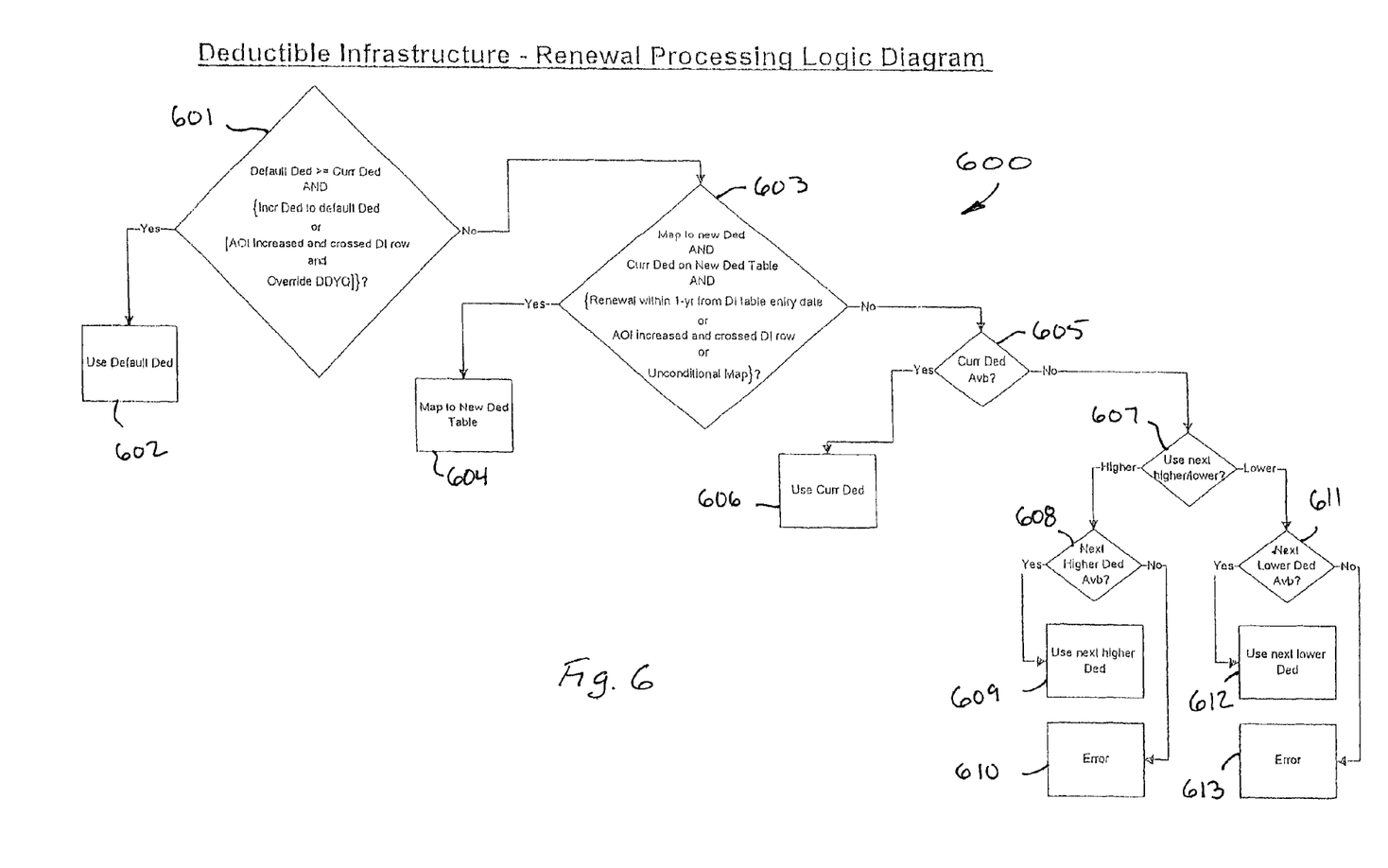
FIG. 6 is a flow chart illustrating an embodiment of a renewal processing logic diagram.

The Deductible Infrastructure—Renewal Processing Logic Diagram 600, FIG. 6, is the logic that the program uses to distinguish the line entries for the tables in FIGS. 1-4. A logic decision 601 uses the variables identified in FIG. 2 to determine if the conditions are met or not met. If the conditions are met, then the logic would direct them to be used at 602, and the default deductible used will be found at 216 and 218, FIG. 2. If the conditions are not met, then logic 603 uses the variables identified in FIG. 2, but not 216 and 218. If the conditions of 603 are met, the new deductible 604 uses the reference key at 230 to define the new deductible. If the conditions of 603 are not met, it is determined at 605 if the current deductible is available. If the deductible is available, that deductible is used at 606. If the current deductible is not available, then logic 607 uses variables found in 238 to determine the next highest or lowest deductible. If 238 is identified as Yes or higher, then logic 608 determines whether or not the next highest deductible is available. If the next highest deductible is available at 609, that deductible is used. If the deductible is not available, the policy will stop at 610 and human intervention will be required to determine the deductible. If 238 is identified as No or lower, then logic 611 determines whether or not the next lowest deductible is available. If the next lowest deductible is available at 612, that deductible is used. If the deductible is not available, the policy will stop at 613 and human intervention will be required to determine the deductible.

Figure 7:
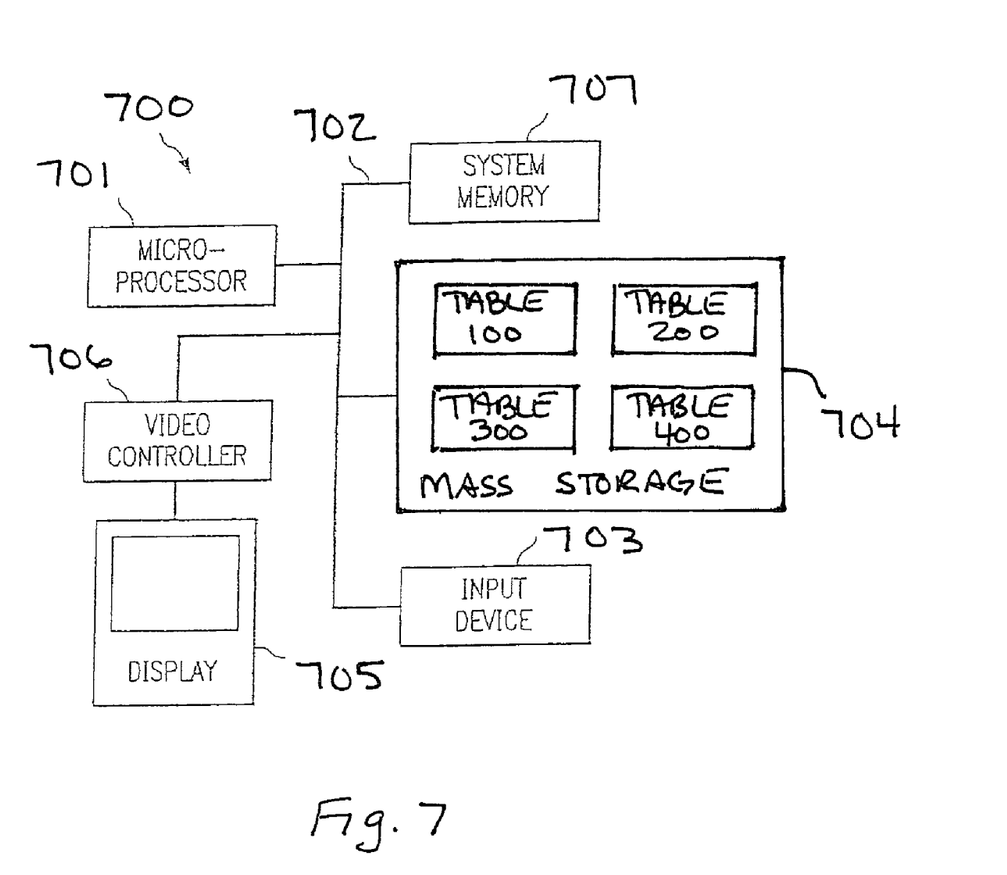
FIG. 7 is an embodiment of an information handling system used to manage and process deductible data.

In one embodiment, an information handling system such as a computer system 700, FIG. 7, may be used to manage deductibles. The computer system 700 includes a microprocessor 701, which is connected to a bus 702. Bus 702 serves as a connection between microprocessor 701 and other components of computer system 700. An input device 703 is coupled to microprocessor 701 to provide input to microprocessor 701. Examples of input devices include keyboards, touchscreens, and pointing devices such as mouses, trackballs and trackpads. Programs and data are stored on a mass storage device 704, which is coupled to microprocessor 701. Mass storage devices include such devices as hard disks, optical disks, magneto-optical drives, floppy drives and the like. Computer system 700 further includes a display 705, which is coupled to microprocessor 701 by a video controller 706. A system memory 707 is coupled to microprocessor 701 to provide the microprocessor with fast storage to facilitate execution of computer programs by microprocessor 701. It should be understood that other busses and intermediate circuits can be deployed between the components described above and microprocessor 701 to facilitate interconnection between the components and the microprocessor. The tables 100, 200, 300 and 400, mentioned above, and containing the variables to be managed and processed, are in the storage 704 to be processed by the processor 701.

The above-described method and system are not for use by customers, i.e. insured parties, but are internal tools used by the insurer for servicing the customers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of determining a renewal deductible for an insurance policy, the method comprising:
   providing a plurality of interrelated tables from a storage device to a microprocessor of a computer system;
   providing a plurality of policy variables for each table to the microprocessor;
   providing a first key reference in a first table to the microprocessor, the first key reference identifying a first specific group of the policy variables;
   retrieving a current deductible associated with the insurance policy;
   matching the first key reference to a second table by the microprocessor, wherein the first key reference identifies a second specific group of the policy variables and a plurality of additional key references, the plurality of additional key references including an available deductible key reference and a new deductible key reference, and wherein the second table includes a default deductible, and a new deductible indicator having either a positive state or a negative state;

matching the available deductible key reference to a third table by the microprocessor, wherein the third table includes a set of available deductibles;

matching the new deductible key reference to a fourth table by the microprocessor, wherein the fourth table comprises a set of old deductibles mapped to a set of new deductibles;

accessing, by the microprocessor, the second table using the first key reference to retrieve the default deductible and the new deductible indicator;

accessing, by the microprocessor, the third table using the available deductible key reference to retrieve the set of available deductibles;

accessing, by the microprocessor, the fourth table using the new deductible key reference to retrieve the set of old deductibles and the set of new deductibles;

determining, by the microprocessor, that the default deductible is less than the current deductible for the insurance policy;

setting the renewal deductible equal to the current deductible if the new deductible indicator is in the negative state and the set of available deductibles includes the current deductible; and mapping the current deductible to one of the set of new deductibles in the fourth table and setting the renewal deductible equal to the one of the set of new deductibles if the new deductible indicator is in the positive state and if the set of old deductibles includes the current deductible.

2. The method as defined in claim 1 wherein the second specific group of policy variables includes the new deductible indicator.

3. The method as defined in claim 1 further comprising providing variables distinguishing deductibles available to the policies and identifying change from the default deductible to the current deductible.

4. The method as defined in claim 1 further comprising:
in the first table, providing a geographical variable, a transaction variable and an effective policy date variable.

5. The method as defined in claim 4 further comprising:
in the second table, providing a first deductible variable and a second deductible variable.

6. The method as defined in claim 5 further comprising:
providing variables distinguishing deductibles available to the policies.

7. The method as defined in claim 5 further comprising:
providing variables identifying change from the default deductible to the current deductible.

8. A non-transitory computer-readable medium comprising a plurality of instructions, which, when executed by a processor, cause the processor to determine a renewal deductible for an insurance policy, the plurality of instructions comprising:

providing a plurality of interrelated tables including a first table, a second table including an available deductible key reference and a new deductible key reference, a third table including a set of available deductibles, and a fourth table including a set of old deductibles mapped to a set of new deductibles;

providing a plurality of policy variables in each table;

providing a first key reference in the first table for identifying a first specific group of the policy variables;

instructions that cause the processor to retrieve a current deductible associated with the insurance policy;

instructions that cause the processor to retrieve a default deductible and a new deductible indicator having either a positive state or a negative state from the second table using the first key reference;

instructions that cause the processor to retrieve the set of available deductibles from the third table using the available deductible key reference;

instructions that cause the processor to retrieve the set of old deductibles and the set of new deductibles from the fourth table using the new deductible key reference;

instructions that cause the processor to determine that the default deductible is less than the current deductible for the insurance policy;

instructions that cause the processor to set the renewal deductible equal to the current deductible if the new deductible indicator is in the negative state and the set of available deductibles includes the current deductible; and instructions that cause the processor to map the current deductible to one of the set of new deductibles in the fourth table and set the renewal deductible equal to the one of the set of new deductibles if the new deductible indicator is in the positive state and if the set of old deductibles includes the current deductible.

9. The non-transitory computer-readable medium as defined in claim 8 wherein the first key reference identifies a first specific group of variables.

10. The non-transitory computer-readable medium as defined in claim 9 wherein the first key reference is matched to the second table.

11. The non-transitory computer-readable medium as defined in claim 10 wherein the first key reference identifies a second specific group of variables and a plurality of additional key references.

12. The non-transitory computer-readable medium as defined in claim 11 wherein the plurality of additional key references are matched to a plurality of respective additional tables.

13. An information handling system for determining a renewal deductible for an insurance policy, the information handling system comprising:

a storage device storing a program;

a processor coupled to the storage device and operative with the program for processing data in a plurality of interrelated tables, wherein the processor is operable to execute instructions of the program, the instructions comprising:

providing a plurality of policy variables in each table;

providing a first key reference in a first table, the first key reference identifying a first specific group of the policy variables;

retrieving a current deductible associated with the insurance policy;

using the first key reference to identify a second specific group of the policy variables in a second table, wherein the second table includes a default deductible, an available deductible key reference, a new deductible key reference, and a new deductible indicator having either a positive state or a negative state using the available deductible reference to identify a set of available deductibles in a third table;

using the new deductible reference key to identify a set of old deductibles mapped to a set of new deductibles;

retrieving the default deductible and the new deductible indicator from the second table;

retrieving the set of available deductibles from the third table using the processor and the available deductible key;

retrieving the set of old deductibles and the set of new deductibles from the fourth table using the processor and the new deductible key;

determining, using the processor, that the default deductible is less than the current deductible for the insurance policy;

setting the renewal deductible equal to the current deductible if the new deductible indicator is in the negative state and the set of available deductibles includes the current deductible; and mapping the current deductible to one of the set of new deductibles in the fourth table and setting the renewal deductible equal to the one of the set of new deductibles if the new deductible indicator is in the positive state and if the set of old deductibles includes the current deductible.

14. The system as defined in claim 13 wherein the first key reference identifies a first specific group of variables.

15. The system as defined in claim 14 wherein the first key reference is matched to the second table.

16. The system as identified in claim 15 wherein the first key reference identifies a second specific group of variables and a plurality of additional key references.

17. The system as identified in claim 16 wherein the plurality of additional key references are matched to a plurality of respective additional tables.

* * * * *